US010389812B2

(12) United States Patent
Xiong et al.

(10) Patent No.: US 10,389,812 B2
(45) Date of Patent: Aug. 20, 2019

(54) DATA TRANSMISSION METHOD AND DEVICE, DISTRIBUTED STORAGE SYSTEM

(71) Applicant: UBTECH Robotics Corp., Shenzhen (CN)

(72) Inventors: Youjun Xiong, Shenzhen (CN); Liangliang Jia, Shenzhen (CN); Desen Su, Shenzhen (CN)

(73) Assignee: UBTECH Robotics Corp., Shenzhen (CN)

( * ) Notice: Subject to any disclaimer, the term of this patent is extended or adjusted under 35 U.S.C. 154(b) by 182 days.

(21) Appl. No.: 15/490,907

(22) Filed: Apr. 19, 2017

(65) Prior Publication Data

US 2018/0191815 A1 Jul. 5, 2018

(30) Foreign Application Priority Data

Dec. 29, 2016 (CN) .......................... 2016 1 1244922

(51) Int. Cl.
*H04L 29/08* (2006.01)

(52) U.S. Cl.
CPC ...... *H04L 67/1097* (2013.01); *H04L 67/1023* (2013.01)

(58) Field of Classification Search
CPC ....................... H04L 67/1097; H04L 67/1023
See application file for complete search history.

(56) References Cited

U.S. PATENT DOCUMENTS

| 9,800,575 | B1* | 10/2017 | Lewis ................. H04L 63/0853 |
| 2011/0026403 | A1* | 2/2011 | Shao ................... H04L 67/2895 370/235 |
| 2016/0259834 | A1* | 9/2016 | Bishop .............. G06F 17/30575 |

* cited by examiner

*Primary Examiner* — Davoud A Zand
*Assistant Examiner* — Kristoffer L S Sayoc

(57) ABSTRACT

A data transmission method is performed in a storage system. The storage system includes a load balancing device and a data storage server cluster. The data uploaded by a terminal is stored in one data storage server of the data storage server cluster, which can avoid single point of failure.

18 Claims, 4 Drawing Sheets

DATA TRANSMISSION METHOD AND DEVICE, DISTRIBUTED STORAGE SYSTEM

CROSS REFERENCE TO RELATED APPLICATIONS

This application claims priority to Chinese Patent Application No. 201611244922.2, filed Dec. 29, 2016, which is hereby incorporated by reference herein, as if set forth in its entirety.

BACKGROUND

1. Technical Field

The present disclosure generally relates to storage technology, and particularly to a data transmission method, a data transmission device, and a distributed storage system.

2. Description of Related Art

End users can upload or download a large amount of data (e.g., image, picture or document) to a server in network side. As a trend of increasing data storage, a single server storage has a poor stability, a poor read and write performance. It's not convenient to file backup, download and view the data.

Therefore, a need exists in the industry to overcome the described problems.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
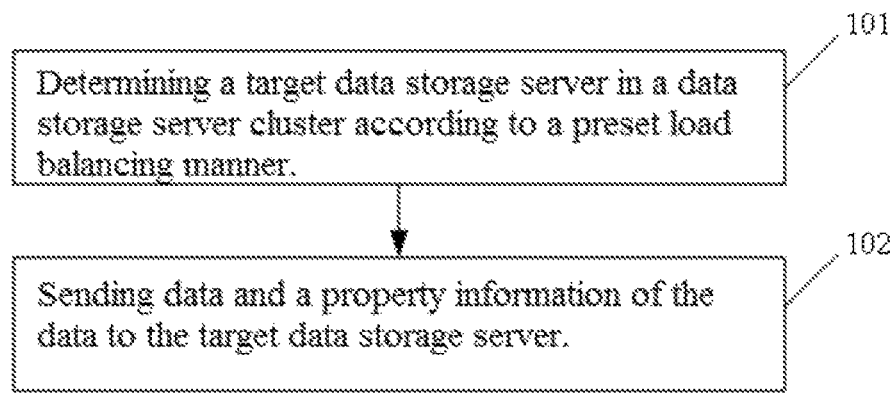
FIG. 1 is a flowchart of a data write operation of a data transmission method according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Write operation is described as below.

FIG. 1 shows a flowchart of a data write operation of a data transmission method according to one embodiment. The data transmission method can comprise a plurality of steps as below.

In step 101, determining a target data storage server in a data storage server cluster according to a preset load balancing manner. In the embodiment, the data storage server cluster can comprise at least two data storage servers.

In step 102, sending data and a property information of the data to the target data storage server. The data is uploaded by a terminal device, e.g. a smart phone, a tablet or other mobile smart terminal. The target data storage server feeds back a path information to the terminal device. The path information can comprise an identification of the target data storage server, a storage position of the data, which are related to the property information of the data.

Figure 2:
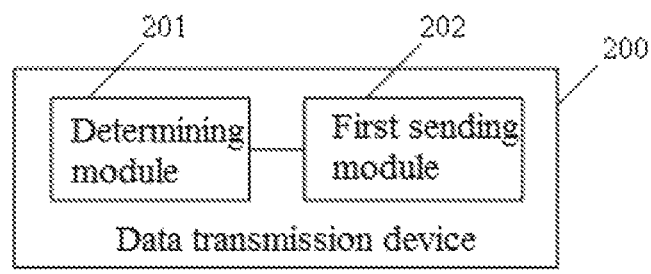
FIG. 2 is block diagram of a data transmission device according to one embodiment.

FIG. 2 shows a date transmission, device 200 according to one embodiment. The data transmission device 200 can comprise a determining module 201 and a first sending module 202. In general, the word "module", as used herein, refers to logic embodied in hardware or firmware, or to a collection of software instructions, written in a programming language, such as Java, C, or assembly. One or more software instructions in the unite may be embedded in firmware, such as in an erasable programmable read only memory (EPROM). The modules described herein may be implemented as either software and/or hardware modules and may be stored in any type of non-transitory computer-readable medium or other storage devices. Some non-limiting examples of non-transitory computer-readable medium comprise CDs, DVDs, BLU-RAY, flash memory, and hard disk drives.

The determining module 201 can determine a target data storage server in a data storage server cluster according to a preset load balancing manner. In the embodiment, the data storage server cluster can comprise at least two data storage servers.

The first sending module 202 can send data and a property information of the data to the target data storage sewer. The data, is uploaded by a terminal device, e.g., a smart phone, a tablet or other mobile smart terminal. The target data storage server feeds back a path information to the terminal device. The path information can comprise an identification of the target data storage server, a storage position of the data, which are related to the property information of the data.

Figure 3:
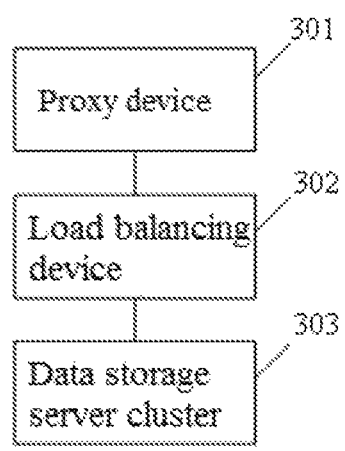
FIG. 3 is a block diagram of a distributed storage system according to one embodiment.

FIG. 3 shows a block diagram of a distributed storage system 300 according to one embodiment. The distributed storage system 300 can comprise a proxy device 301, a load balancing device 302, and a data storage server cluster 303.

The proxy device 301 can send the data uploaded by the terminal device and the property information to the load balancing device 302.

The data storage sever cluster 303 comprises at least two data storage servers.

The load balancing device 302 sets the load balancing manner and determines a target data storage server according to the load balancing manner. Further, the load balancing device 302 can send data and a property information of the data to the target data storage server. The data is uploaded by a terminal device, e.g. a smart phone, a tablet or other mobile smart terminal. The target data storage server feeds back a path information to the terminal device. The path information can comprise an identification of the target data storage server, a storage position of the data, which are related to the property information of the data.

In one embodiment, the load balancing device 302 of FIG. 3 has a same structure with the data transmission device 200.

The data transmission method, the data transmission device can the distributed storage system are applied in the data storage server cluster. The data sent by the terminal device is read in the target data storage server, which can avoid single point of failure. The data transmission method device and the distributed storage system have a good stability, a good read and write performance. The data storage server cluster can dynamically extend nodes and storage capability. The storage position of the path information is fed back to the terminal device, which is convenient to file backup, download and view for the terminal device.

Figure 4:
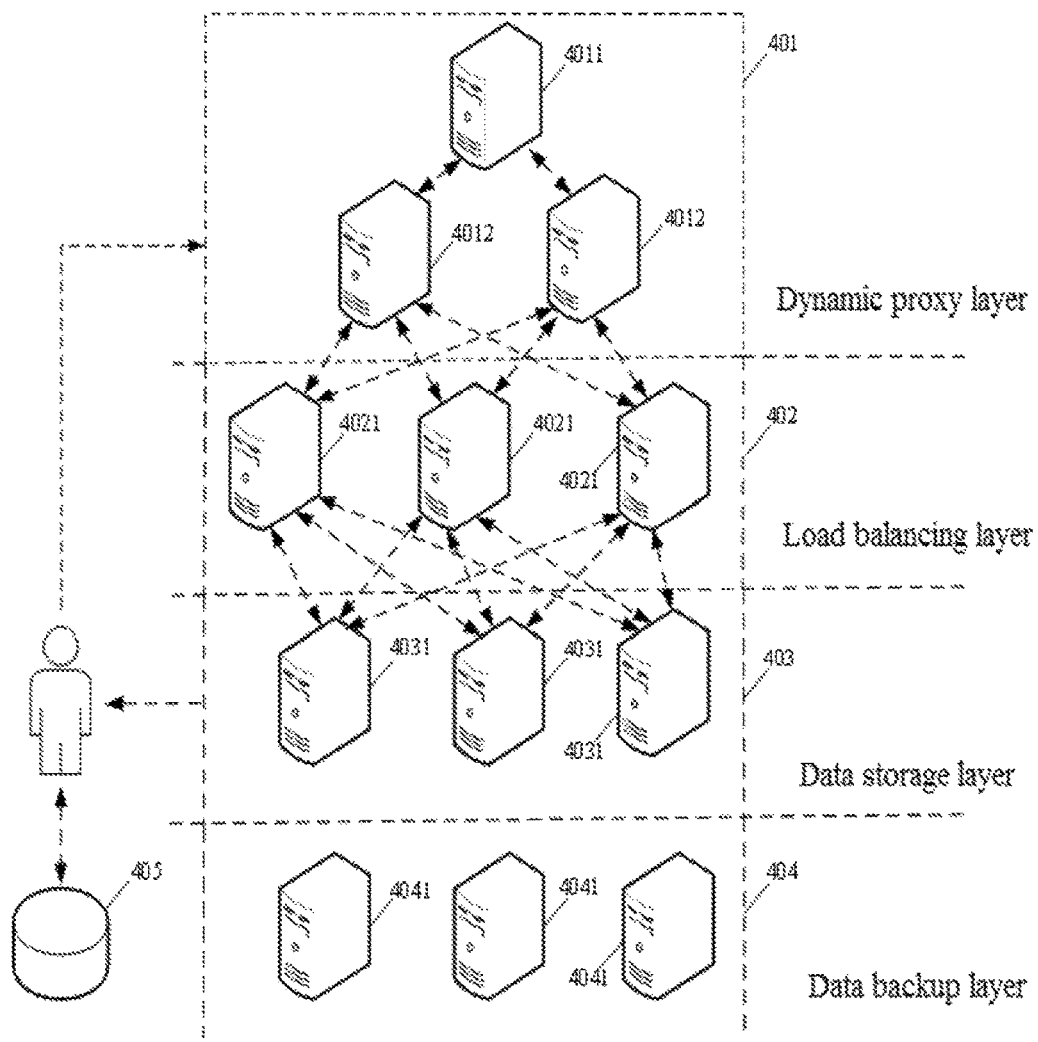
FIG. 4 is a block diagram of a distributed storage system according to another embodiment.

FIG. 4 shows a block diagram of a distributed storage system according to one embodiment. The distributed storage system can comprise a dynamic proxy layer, a load balancing layer, a data storage layer, and a data backup layer.

The dynamic proxy layer comprises the proxy device 401. The load balancing layer comprises the load balancing device 402. The data storage layer comprises the data storage server cluster 403. The data backup layer comprises a data backup server cluster 404. The load balancing device 402 comprises at least two load balancing servers 4021. The data storage server cluster 403 comprises at least two data storage servers. The data backup server cluster 404 comprises at least two data backup servers 4041.

The distributed storage system can further comprise a data base 405.

In another embodiment, the proxy device 401 can comprise a virtual server 4011 and at least two control servers 4012. The virtual server 4011 corresponds to one access address; the terminal device can communicate with the virtual server 4011 via visiting the access address. The virtual server 4011 detects states of the control servers 4012 and randomly assigns the data uploaded by the terminal device and the property information to one of the at least two control servers 4012, which is in a normal state. The control server 4012 sends the data to the load balancing device 402.

In the embodiment, the control server 4012 can be performed by Nginx and Keeplived on the Nginx can perform state detection and select one server in the normal state.

In the embodiment, the load balancing device 402 can comprise at least two load balancing servers 4021. The control server 4012 can detect states of the load balancing servers 4021 and select one load balancing server 4021 in the normal state. The control server 4012 can send the data uploaded from the terminal device to the load balancing server 4021 in the normal state. Keeplived can select the load balancing server 4021 to avoid single point of failure.

In the embodiment, the load balancing server 4021 determines the target data storage server according the preset load balancing manner. The load balancing server 4021 sends the data and the property information uploaded by the control server 4012 to the data storage server.

The load balancing server 4021 can select the target data storage server via a plurality of ways. In one embodiment, the load balancing server 4021 can obtain a weight of each data storage server 4031 and select a data storage server 4031 having a maximum, weight as a primary target data storage server. The load balancing server 4021 can calculate a weight ratio of the primary target data storage server with the other data storage servers and select a data storage server having a minimum weight ratio as a second target data storage server. The load balancing sever 4021 can evenly store the data in the primary target data storage server and the second target data storage server according to the weight ratios of the primary target data storage server and the second target data storage server. The target data storage server can comprise the primary data storage server and the second target data storage server. The weight denotes a load of the data storage server 4031. A larger weight of the data storage server 4031 denotes a smaller load, and the data storage server with a larger weight, can be selected with a higher probability. In one embodiment, if a weight of one data storage server is zero, the data cannot be stored in the data storage server 4031, that is, the data storage server with zero weight is deleted when the data is uploaded. But the data of the data storage server with zero weight can be read.

In the embodiment, the data stored in the data storage server 4031 has the property information. The data can be a picture, and the property information can comprise at least one of a shooting time, an upload time, a shooting location, a shooting type (e.g., scenery, portrait, or animal), a picture size, and a picture number.

In the embodiment, each data storage server 4031 can be set with an initial weight and each data storage server 4031 reports a storage capacity to the load balancing server 4021 after a predetermined time. The load balancing server 4021 can update the weight of the data storage server 4031 according to a predetermined relation. The data storage server 4031 can report the storage capacity to all load balancing servers 4021 with the identification of the data storage server 4031, the identification can be such as a number of the data storage server 4031, thus the load balancing server 4021 can record an updated weight of each data storage server 4031.

The data storage server cluster 403 is located in the data storage layer, which can comprise at least two data storage servers 4031.

In another embodiment, the data storage server 4031 can create a data storage directory after a predetermined time.

In another embodiment, the data storage server 4031 can feed back the path information to the terminal device. The terminal device can store the path information and the property information of the uploaded data in the data base 405. The path information can be searched by the property information in the data base. A combination of a plurality of property information can correspond to the path information.

The data backup cluster 404 is located in the data backup layer, which can comprise at least two data backup servers 4041. Each data backup server 4041 corresponds to one data storage server. When the load balancing server 4021 sends the data uploaded by the terminal device and the property information to the data storage server, the load balancing server 4021 simultaneously sends the data uploaded by the terminal device and the property information to the data backup server 4041. In another embodiment, when the data storage server 4031 creates the data storage directory after a predetermined time, the data backup server 4041 synchronously creates a data backup directory.

In one embodiment, a synchronization of the data storage server 4031 and the data backup server 4041 can be realized in a plurality of ways.

In an alternative embodiment, the load balancing server 4021 of FIG. 4 has a same structure with the data transmission device of FIG. 2, which comprises the determining module 201 and the first sending module 202. Further, the determining module 201 can comprise an obtaining sub-module and a selecting sub-module. The obtaining sub-module can obtain a weight of each data storage server 4031. The selecting sub-module can select a data storage server 4031 having a maximum weight as a primary target data storage server and calculate a weight ratio of the primary target data storage server with the other data storage servers and select a data storage server having a minimum weight ratio as a second target data storage server. The first sending module 202 can assign the data and the property information to store in the primary target data storage server and the second target data storage server according to the weight ratios of the primary target data storage server and the second target data storage server. Furthermore, the first sending module 202 sends the data uploaded by the terminal and the property information to the data backup server 4041 corresponding to the data storage server.

Read operation is described as below.

Figure 5:
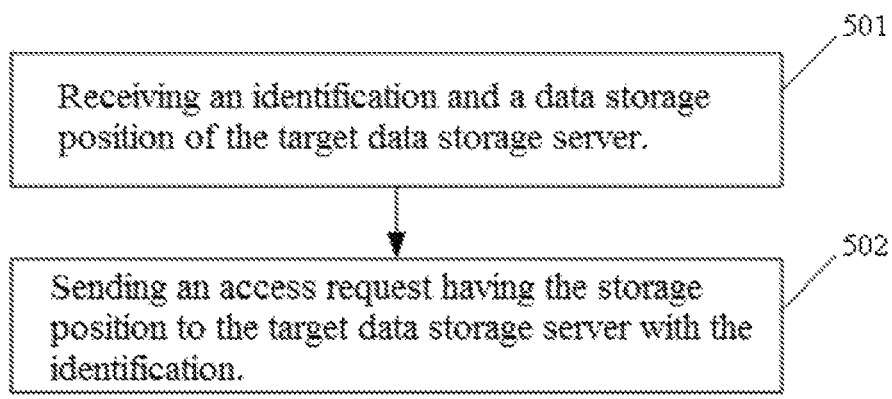
FIG. 5 is a flowchart of a data read operation of a data transmission method according to one embodiment.

FIG. 5 shows a flowchart of a data read operation of a data transmission method according to one embodiment. The data transmission method comprises a plurality of steps as below.

In step 501, receiving an identification and a data storage position of the target data storage server. In the embodiment, the terminal device receives a property information of the data to be read, and searches for a path information corresponding to the property information, and then sends the path information to the distributed storage system for parsing. The terminal device can obtain the identification and the data storage position of the target data storage server.

In step 502, sending an access request with the storage position to the target data storage server having the identification.

The target data storage server having the identification is located in the data storage server cluster, which comprises at least two data storage servers.

Figure 6:
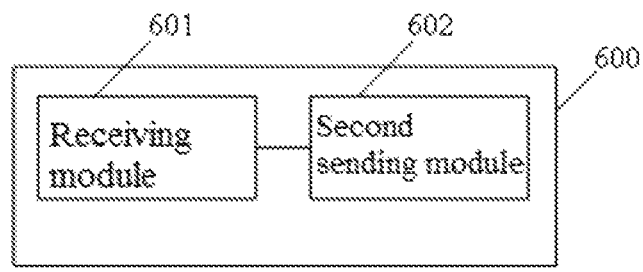
FIG. 6 is a block diagram of a data transmission device according to another embodiment.

FIG. 6 shows a block diagram of a data transmission device 600 according to another embodiment. The data transmission device 600 can comprise a receiving module 601 and a second sending module 602.

The receiving module 601 can receive the identification and the data storage position of the target data storage server parsed from the path information.

The second sending module 602 can send an access request with the storage position to the target data storage sewer having the identification.

The target data storage server having the identification is configured to send the data corresponding to the storage position to the terminal device.

The distributed storage system of the write operation has a same structure with the distributed storage system of FIG. 3.

The distributed storage system can comprise a proxy device 301, a load balancing device 302, and a data storage server cluster 303.

The proxy device 301 can parse the path information sent by the terminal device and send the identification of the target data storage server and the storage position to the load balancing device 302.

In the embodiment, the data storage server cluster 303 can comprise at least two data storage servers.

The load balancing device 302 can send an access request with the storage position to the target data storage server having the identification.

The target data storage server having the identification is configured to send the data corresponding to the storage position to the terminal device.

In an alternative embodiment, the load balancing device 302 of FIG. 3 has a same structure with the data transmission device 600 of FIG. 6.

The distributed storage system is similar to FIG. 4. The distributed storage system can comprise a dynamic proxy layer, a load balancing layer, a data storage layer, and a data backup layer.

The dynamic proxy layer comprises the proxy device 401. The load balancing layer comprises the load balancing device 402. The data storage layer comprises the data storage server cluster 403. The data backup layer comprises a data backup server cluster 404. The load balancing device 402 comprises at least two load balancing servers 4021. The data storage server cluster 403 comprises at least two data storage servers. The data backup server cluster 404 comprises at least two data backup servers 4041.

The distributed storage system can farther comprise a data base 405.

In another embodiment, the proxy device 401 can comprise a virtual server 4011 and at least two control servers 4012. The virtual server 4011 corresponds to one access address; the terminal device can communicate with the virtual server 4011 via visiting the access address. The virtual server 4011 detects states of the control server 4012 and randomly assigns the path information sent by the terminal device and the property information to one of the at least two control servers 4012, which is in a normal state. The control server 4012 is configured to parse the path information and send the identification of the target data storage server and the storage position to the load balancing device 402. The terminal device can obtain the path information via accessing the data base 405.

In the embodiment, the control server 4012 can be performed by Nginx and Keeplived on the Nginx can perform state detection and select one server in the normal state.

In an alternative embodiment the control server 4012 is coupled to a buffer server (not shown in FIG. 4). When downloads of the path information exceed a preset threshold, the data storage server 4031 can store the data in the buffer server. And the control server 4012 parses the path information sent by the terminal device, the control server 4012 can directly send an access request to the buffer server and receive the data corresponding to the access request. In the embodiment, the access request sent to the data storage server 403 via the load balancing device 402 is not needed.

In an alternative embodiment, the load balancing device 402 can comprise at least two load balancing servers 4021. The control server 4012 can detect states of the load balancing servers 4021 and select one load balancing server 4021 in normal state. The control server 4012 can send the data uploaded from the terminal device to the load balancing server 4021 in the normal state. Keeplived can select the load balancing server 4021 to avoid single point of failure.

In an alternative embodiment, the load balancing server 4021 is positioned to the target data storage server 4031 in responsive to a parsing result, which is identified with the identification of the data storage server 4031. The load balancing server 4021 can send the access request with the storage position to the target data storage server 4031.

The data storage server cluster 403 is located in the data storage layer, which can comprise at least two data storage servers 4031.

The data backup server cluster 404 is located in the data backup layer, which can comprise at least two data backup servers 4041. And each data backup server 4041 corresponds to one data storage server; the data backup is performed by the data backup server 4041. When the load balancing server 4021 detects that the target data storage server 4031 with the identification is not in the normal state, the load balancing server 4021 can send the access request to the data backup server 4041 corresponding to the data storage server 4031 which is not in the normal state and receive the data corresponding to the storage position.

In an alternative embodiment, the load balancing server 4021 has a same structure with the data transmission device 600 of FIG. 6. The load balancing server 4021 can comprise the receiving module 601 and the second sending module 602. When the second sending module 602 detects that the target data storage server 4031 is not in the normal state, the second sending module 602 can send the access request to the data backup server 4041 corresponding to the data storage server 4031.

As a ratio of read operation is greater than a ratio of write operation, the read operation and the write operation of the present disclosure are divided. Thus the write operation cannot be affected by the read operation.

The read operation and the write operation can be performed by one device, and the distributed storage systems of the read operation and the write operation can be realized in a same architecture.

The plurality of modules of data transmission device of FIG. 2 and FIG. 6 can be realized by software, hardware, or software and hardware together.

In an alternative embodiment, the data transmission device can comprise a processor and a storage, the storage is configured to store one or more executable instructions. When the processor read the executable instructions, the read and write operations can be performed.

Although the features and elements of the present disclosure are described as embodiments in particular combinations, each feature or element can be used alone or in other various combinations within the principles of the present disclosure to the full extent indicated by the broad, general meaning of the terms in which the appended claims are expressed.

What is claimed is:

1. A data transmission method for a distributed storage system comprising a data storage server cluster having at least two data storage servers, a data transmission device, and a terminal device communicating via a computerized network, the method comprising:
    determining, by the data transmission device, a target data storage server in the data storage server cluster according to a preset load balancing manner of the data storage server cluster, the data storage server cluster dynamically adding data storage servers to expand storage capability of the data storage server cluster;
    assigning, by the data transmission device via the computerized network, data unloaded by the terminal device and property information of the data to store in a primary target data storage server of one of the data storage servers and a second target data storage server of another of the data storage servers according to weight ratios of the primary tar et data storage server and the second target data storage server;
    sending, by the target data storage server via the computerized network, path information of the data to the terminal device, wherein the path information comprises an identification of the target data storage server, and a storage position of the data; and
    relating, by the target data storage server, the path information to the property information of the data such that the terminal device searches for the path information based on the property information of the data.

2. The data transmission method of claim 1, wherein determining by the data transmission device, the target data storage server according to the preset load balancing manner comprises:
    obtaining a weight of each data storage server;
    calculating a weight ratio of a data storage server having a maximum weight and the other data storage servers;
    selecting the data storage server with the maximum weight as a primary target data storage server and a data storage server with a minimum weight ratio as a second target data storage server.

3. The data transmission method of claim 1, further comprising:
    sending the data uploaded by the terminal device and the property information to a data backup server corresponding to the data storage server.

4. The data transmission method of claim 1, further comprising:
    receiving an identification and the data storage position of the target data storage server parsed by the path information;
    sending an access request with the storage position to the target data storage server having the identification;
    sending the data corresponding to the storage position to the terminal device.

5. The data transmission method of claim 4, wherein when the target data storage server having the identification is not in a normal state, the access request is sent to a data backup server corresponding to the target data storage server having the identification.

6. A data transmission device for a distributed storage system comprising a data storage server cluster having at least two data storage servers, a terminal device, and the data transmission device communicating via a computerized network, comprising: a storage and a processor, wherein the data storage server cluster is configured to dynamically add data storage servers to expand storage capability, the storage comprises instructions executable by the processor, the instructions comprising:
    a determining module determining, by the data transmission device, a target data storage server among the data storage servers of the data storage server cluster according to a preset load balancing manner of the data storage server cluster;
    a first sending module assigning, by the data transmission device via the computerized network, data uploaded by the terminal device and property information of the data to store in a primary target data storage server of one of the data storage servers and a second target data storage server of another of the data storage servers according to weight ratios of the primary target data storage server and the second target data storage server; and the target data storage server sending path information of the data to the terminal device via the computerized network; wherein the path information comprises an identification of the target data storage server, and a storage position of the data; and the target data storage server further relating the path information to the property information of the data such that the terminal device searches for the path information based on the property information of the data.

7. The data transmission device of claim 6, wherein the determining module comprises:
    an obtaining sub-module obtaining a weight of each data storage server;
    a selecting sub-module calculating a weight ratio of a data storage server having a maximum weight and the other data storage servers and selecting the data storage server with the maximum weight as a primary target data storage server and a data storage server with a minimum weight ratio as a second target data storage server.

8. The data transmission device of claim 6, wherein the first sending module is configured to send the data uploaded by the terminal device and the property information to a data backup server corresponding to the data storage server.

9. The data transmission device of claim 6, further comprising:

a receiving module receiving an identification and the data storage position of the target data storage parsed by the path information;

a second sending module sending an access request with the storage position to the target data storage server having the identification; and the target data storage server configured to send the data corresponding to the storage position to the terminal device.

10. The data transmission device of claim 9, wherein when the second sending module detects that the target data storage server having the identification is not in a normal state, the access request is sent to a data backup server corresponding to the target data storage server having the identification; and the data backup server is configured to send the data corresponding to the storage position to the terminal device.

11. A distributed storage system, comprising:

a data storage server cluster having at least two data storage servers, wherein the data storage server cluster is configured to dynamically add data storage servers to expand storage capability;

a terminal device uploading data via a computerized network;

a load balancing device setting a load balancing manner, determining a target data storage server among the data storage servers of the data storage server cluster according to the load balancing manner, and sending the data and property information of the data to the target data storage server via the computerized network; and a proxy device sending the data received from the terminal device and the property information to the load balancing device;

wherein, the target data storage server sends path information of the data to the terminal device via the computerized network, the path information comprises an identification of the target data storage server, and a storage position of the data, and the path information is related to the property information of the data such that the terminal device searches for the path information based on the property information of the data.

12. The distributed storage system of claim 11, wherein the proxy device comprises a virtual server and at least two control servers; the virtual server detects states of the control servers and sends the data and the property information to one of the at least two control servers in a normal state;

the control server sends the data and the property corresponding to the data to the load balancing device.

13. The distributed storage system of claim 12, wherein the load balancing device comprises at least two load balancing servers;

the control server detects states of the at least two load balancing servers and selects one of the at least two load balancing servers in normal state to send the data.

14. The distributed storage of claim 11, wherein the data storage creates a data storage directory after a predetermined time.

15. The distributed storage system of claim 11, further comprising a data backup server cluster having at least two data backup servers, and each data backup server corresponds to one data storage server;

the data backup server corresponding to the data storage server is configured to receive the data and the property information sent by the load balancing device.

16. The distributed storage system of claim 11, wherein the proxy device parses the path information sent by the terminal device and sends an identification and the data storage position of the target data storage server to the load balancing device;

the load balancing device sends an access request with the storage position to the target data storage server having the identification; and the target data storage server is configured to send the data corresponding to the storage position to the terminal device.

17. The distributed storage system of claim 16, further comprising a buffer server; wherein the target data storage server having the identification is configured to store the data corresponding to the storage position in the buffer server; and the buffer server receives the access request sent by the proxy device and send a buffer data corresponding to the access request to the proxy device.

18. The distributed storage system of claim 16, further comprising a data backup server cluster having at least two data backup servers, and each data backup server corresponds to one data storage server;

wherein when the target data storage server having the identification is not in normal state, the load balancing device sends the access request to the data backup server corresponding to the data storage server, which is not in the normal state; and the data backup server sends the data corresponding to the storage position to the terminal device.

* * * * *